United States Patent
Liu et al.

(10) Patent No.: US 7,796,719 B2
(45) Date of Patent: Sep. 14, 2010

(54) SIGNAL DETECTION APPARATUS AND METHOD THEREOF

(75) Inventors: Chuan Liu, Tainan County (TW); Chuan-Cheng Hsiao, Hsinchu (TW); Pao-Ching Tseng, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 819 days.

(21) Appl. No.: 11/125,475

(22) Filed: May 10, 2005

(65) Prior Publication Data

US 2005/0254610 A1    Nov. 17, 2005

(30) Foreign Application Priority Data

May 12, 2004    (TW) .............................. 93113368 A

(51) Int. Cl.
*H03D 3/24* (2006.01)

(52) U.S. Cl. .................. 375/373; 375/350; 375/360; 375/375; 710/1; 710/29; 327/291; 331/2

(58) Field of Classification Search .............. 375/373, 375/350; 710/1, 29; 327/291; 331/2; 360/46
See application file for complete search history.

(56) References Cited

U.S. PATENT DOCUMENTS

| | | | | |
|---|---|---|---|---|
| 7,176,738 B1 * | 2/2007 | Hwang et al. | ............... | 327/291 |
| 7,260,164 B2 * | 8/2007 | Janapaty et al. | ............. | 375/350 |
| 7,263,153 B2 * | 8/2007 | Sutioso et al. | .............. | 375/373 |
| 7,272,673 B2 * | 9/2007 | Liu et al. | ...................... | 710/29 |
| 2001/0045868 A1 * | 11/2001 | Takeyabu et al. | ............... | 331/2 |
| 2004/0193737 A1 * | 9/2004 | Huffman et al. | ............... | 710/1 |
| 2005/0219728 A1 * | 10/2005 | Durbin et al. | ................. | 360/46 |

\* cited by examiner

*Primary Examiner*—Sudhanshu C Pathak
(74) *Attorney, Agent, or Firm*—Hoffman Warnick LLC

(57) ABSTRACT

The invention discloses a signal detection apparatus and method thereof for detecting whether an input signal of a set of serial ATA signals is an out of band (OOB) signal. The signal detection apparatus includes a calibrated clock generation device, a signal processor, and a logic determination device. The calibrated clock generation device generates a sampling clock signal according to a predetermined clock signal. The signal processor generates a plurality of detection results based on the sampling clock signal and the input signal. The logic determination device receives the plural of detection results and determines whether the input signal is the OOB signal.

16 Claims, 9 Drawing Sheets

SIGNAL DETECTION APPARATUS AND METHOD THEREOF

BACKGROUND OF THE INVENTION

1. Field of the Invention

The present invention relates to a signal detection apparatus, especially to a signal detection apparatus utilizing a fast/multi-frequency clock generator to generate a sampling clock signal.

2. Description of the Prior Art

The protocol for transmitting data between electronic apparatuses is always a key point in research and development. There are various protocol standards for transmitting a large amount of data in high speed, e.g. integrated drive electronics (IDE), advanced technology attachment (ATA), serial ATA (SATA), and so on. SATA is the improved version of ATA.

Referring to FIG. 1(a) and FIG. 1(b), FIG. 1(a) is a schematic diagram of two electronic apparatuses 10 and 12 transmitting data between each other based on SATA standard. FIG. 1(b) is a waveform diagram of a set of signals 22 of SATA of the prior art. As shown in FIG. 1(a), the electronic apparatus 10 connects to the electronic apparatus 12 by two wirings 14 and 16 in the SATA standard. Each of the electronic apparatuses 10 and 12 has a transmitting side 18 and a receiving side 20. The transmitting side 18 of the electronic apparatus 10 connects to the receiving side 20 of the electronic apparatus 12 by the wiring 14. The receiving side 20 of the electronic apparatus 10 connects to the transmitting side 18 of the electronic apparatus 12 by the wiring 16.

The waveform diagram shown in FIG. 1(b) represents a set of SATA signals 22. According to the SATA protocol, the set of signals is used for building a channel of communication to transmit data. Under the SATA protocol, the two electronic apparatuses, which transmit data between each other, respectively represent a host and a device.

For example, when the electronic apparatus 10 is the host, and it transmits data to the device, which represents the electronic apparatus 12, a set of out of band (OOB) signals 22 is sent out to build the connection to transmit data. The set of OOB signals 22 includes a COMRESET/COMINIT signal, and a COMWAKE signal for ensuring that connection between the two electronic apparatuses 10 and 12 is being built. After the electronic apparatuses 10 and 12 respectively receive a device align signal and a host align signal, the connection between host and device is established, and then the electronic apparatuses 10 and 12 start to transmit data. The electronic apparatus 10 and the electronic apparatus 12 respectively have a determination circuit (not shown) for determining whether the signal transmitted via the wirings 14 and 16 is a COMRESET signal, a COMINIT signal, or a COMWAKE.

Referring to FIG. 2, FIG. 2 is a schematic diagram for representing the waveform of the COMRESET signal, the COMINIT signal, and the COMWAKE signal. In general, these signals have a first state and a second state. The first state represents an idle state, and the second state represents a burst state. The time interval of the first state depends on different signals, as shown in FIG. 2.

The determination circuit detects the input signal in a sampling manner. The determination circuit first receives a clock signal from a clock generator. According to the received clock signal, the determination circuit samples the input signal by a specific time interval and compares the sampled input with that of processing the COMRESET signal, the COMINIT signal, or the COMWAKE signal to obtain a detection result.

However, the electronic apparatus 10 or the electronic apparatus 12 may get into an idle state sometimes due to the demand of the system. When the apparatus is in the idle state, the clock generator of the apparatus may turn off, so the determination circuit cannot obtain the clock signal. When the apparatus gets into the idle state, the prior art utilizes a set of RC circuits to detect the input signal. However, due to the variation in production processes, the time parameter of the RC circuit usually varies, and the detection result will be inaccurate.

SUMMARY OF THE INVENTION

The objective of the present invention is to provide a signal detection apparatus and the method thereof. The signal detection apparatus includes a calibrated clock generation device, a signal processor, and a logic determination device. The calibrated clock generation device generates a sampling clock signal according to a predetermined clock signal. The signal processor generates a plurality of detection results based on the sampling clock signal and the input signal. The logic determination device receives the plurality of detection results and determines whether the input signal is the OOB signal.

BRIEF DESCRIPTION OF THE APPENDED DRAWINGS

DETAILED DESCRIPTION OF THE INVENTION

Figure 3:
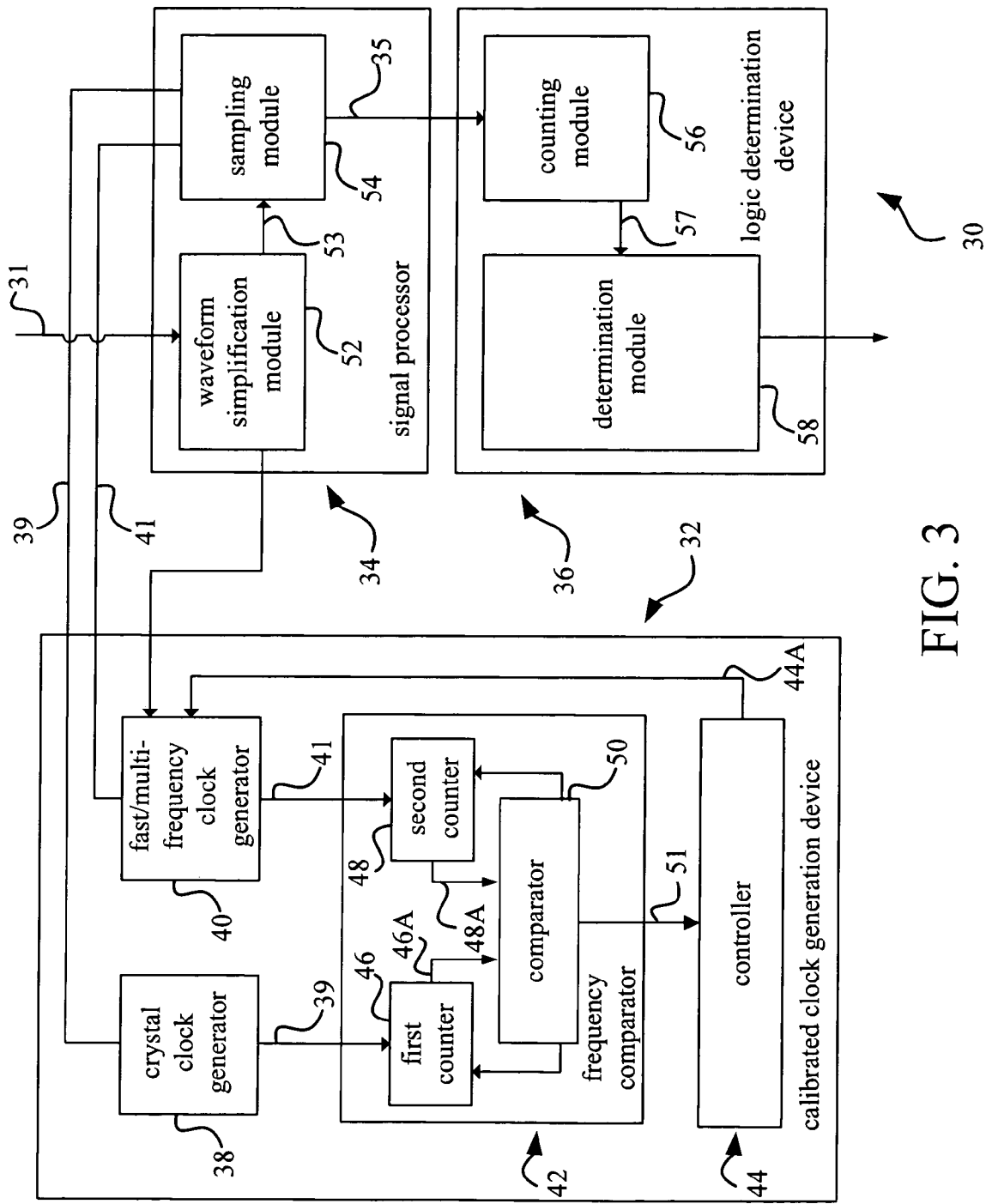
FIG. 3 is a block diagram of the signal detection apparatus according to the present invention.

Referring to FIG. 3, FIG. 3 is a block diagram of the signal detection apparatus 30 according to the present invention. The signal detection apparatus of the present invention is used for detecting a serial advanced technology attachment (ATA) signal and for determining the kind of the signal. In an embodiment, according to the present invention, a signal detection apparatus 30 is applied to the electronic apparatus 10 shown in FIG. 1 and is used for detecting whether an input signal 31 of a set of serial ATA signals is an out of band (OOB) signal. The signal detection apparatus 30 includes a calibrated clock generation device 32, a signal processor 34, and a logic determination device 36. The calibrated clock generation device 32 is connected to the signal processor 34, and the signal processor 34 is connected to the logic determination device 36. The calibrated clock generation device 32 generates a sampling clock signal according to a predetermined clock signal. The signal processor 34 generates a plurality of detection results 35 based on the sampling clock signal and the input signal 31 of the serial ATA signals. The logic determination device 36 receives the plurality of detection results 35, determines whether the input signal 31 is the OOB signal, and outputs the final result.

The calibrated clock generation device 32 includes a crystal clock generator 38, a fast/multi-frequency clock generator 40, a frequency comparator 42, and a controller 44. The crystal clock generator 38 and the fast/multi-frequency clock generator 40 are used for generating the clock signal. The calibrated clock generation device 32 can utilize the clock signal, which is generated by the crystal clock generator 38 or the fast/multi-frequency clock generator 40, to be the sampling clock signal. Then, the calibrated clock generation device 32 transmits the sampling clock signal to the signal processor 34 to be used for sampling.

When the electronic apparatus 10 is activated, the calibrated clock generation device 32 immediately transmits the clock signal 39 generated by the crystal clock generator 38 to the signal processor 34. When the electronic apparatus 10 gets into the idle state, the controller 44 of the calibrated clock generation device 32 activates the fast/multi-frequency clock generator 40 and transmits the clock signal 41 generated by the fast/multi-frequency clock generator 40 to the signal processor 34.

Figure 4:
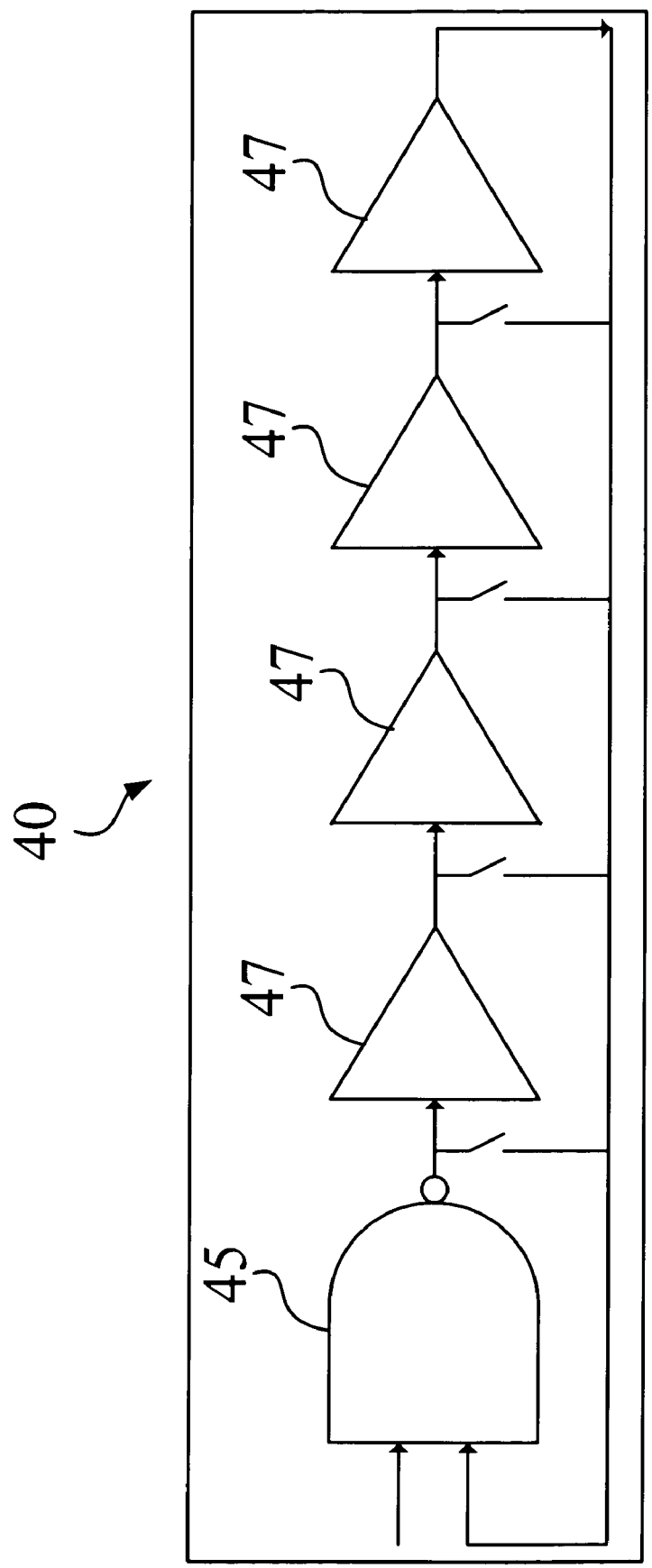
FIG. 4 is a schematic diagram of the fast/multi-frequency clock generator shown in FIG. 3.

Referring to FIG. 4, FIG. 4 is a schematic diagram of the fast/multi-frequency clock generator 40 shown in FIG. 3. The fast/multi-frequency clock generator 40 consists of a logic gate 45 and a plurality of time delay devices 47. When the current leaves the logic gate 45 and then comes back to the logic gate 45 via the plurality of predetermined time delay devices 47, the clock signal 41 is generated.

When the electronic apparatus 10 is at the activated state, the calibrated clock generation device 32 immediately outputs the clock signal 39 of the crystal clock generator 38. When the electronic apparatus 10 is changing from the activated state to the idle state, the calibrated clock generation device 32 utilizes the crystal clock generator 38 to calibrate the fast/multi-frequency clock generator 40 to ensure the accuracy of the clock generated by the fast/multi-frequency clock generator 40. When the electronic apparatus 10 gets into the idle state, the calibrated clock generation device 32 outputs the clock signal 41 of the fast/multi-frequency clock generator 40. Therefore, the calibrated clock generation device 32 determines whether to output the clock signal 39 of the crystal clock generator 38 or the clock signal 41 of the fast/multi-frequency clock generator 40 according to whether the electronic apparatus 10 is in the idle state.

As shown in FIG. 3, the frequency comparator 42 includes a first counter 46, a second counter 48, and a comparator 50. When the calibration is being performed, the calibrated clock generation device 32 takes the clock signal 39 generated by the crystal clock generator 38 as the predetermined clock signal. The first counter 46 is used for receiving the predetermined clock signal 39 generated by the crystal clock generator 38. The second counter 48 is used for receiving the clock signal 41 generated by the fast/multi-frequency clock generator 40. The first counter 46 adds up the number of pulses of the clock signal 39, and when the clock signal 39 generates a predetermined number of pulses, the first counter 46 outputs a first count completed signal 46A to the comparator 50. The second counter 48 adds up the number of pulses of the clock signal 41, and when the clock signal 41 generates a predetermined number of pulses, the second counter 48 outputs a second count completed signal 48A to the comparator 50. The comparator 50 compares the time needed to receive the first count completed signal 46A with the time needed to receive the second count completed signal 48A to obtain the time difference, so as to generate a frequency comparison result 51. Then, the comparator 50 resets the first counter 46 and the second counter 48.

The controller 44 is used for selectively activating the fast/multi-frequency clock generator 40. The controller 44 further generates a frequency calibration signal 44A to the fast/multi-frequency clock generator 40, based on the frequency comparison result 51, to calibrate the fast/multi-frequency clock generator 40. The frequency of the clock signal 41 can be adjusted by limiting the number of the time delay devices 47 which the current inside the fast/multi-frequency clock generator 40 passes through.

After the calibrated clock generation device 32 outputs the sampling clock signal (39 or 41), the signal processor 34 will continue to process the signal. The signal processor 34 includes a waveform simplification module 52 and a sampling module 54. The waveform simplification module 52 receives the input signal 31 and generates a simplified control signal 53 according to an enveloped curve connecting a plurality of peaks of the input signal 31. The input signal 31 has a first state and a second state. The first state represents an idle state, and the second state represents a burst state. The waveform simplification module 52 takes the input signal 31, which is at the first state, to be 0, and takes the input signal 31, which is at the second state, to be 1, and then it outputs the simplified control signal 53 accordingly. The sampling module 54 receives the simplified control signal 53 and the sampling clock signal transmitted from the calibrated clock generation device 32. The sampling module 54 further samples the simplified control signal 53 with a predetermined fixed time interval, e.g. every 10 nanosecond, based on the sampling clock signal to detect whether 0 of the first state or 1 of the second state appears in the simplified control signal 53 and to generate the plurality of detection results 35. The signal processor 34 transmits the plurality of detection results 35 to the logic determination device 36 to perform the determination.

The logic determination device 36 includes a counting module 56 and a determination module 58. The counting module 56 receives the plurality of detection results 35. The counting module 56 further counts the number of first states and the number of second states which continuously appear in the plurality of detection results 35 so as to obtain the length of time which the first state and the second state appear in the input signal; then, it generates a clock length signal 57 which is sent to the determination module 58. According to the clock length signal 57, the determination module 58 compares the time length of the first state and the second state appearing in the input signal 31 with the standard length of the first state and the second state of the OOB signal in the serial ATA protocol, so as to determine whether the input signal 31 is an OOB signal. Moreover, to raise the accuracy, the determination module 58 can continuously compare the time length of the first state and the second state appearing in the input signal 31 with the standard length of the first state and the second state of the OOB signal in the serial ATA for four times, so as to determine whether the input signal 31 is an OOB signal.

The set of serial ATA signals further includes a COMINIT/COMRESET signal, or a COMWAKE signal. In another embodiment, the signal detection apparatus of the present invention can be used for detecting whether an input signal of a set of serial ATA signals is the COMINIT/COMRESET signal, or the COMWAKE signal. Because the COMINIT/COMRESET signal, or the COMWAKE signal have a standard time period of the first state and the second state, the signal detection apparatus can compare the time length received by the determination module with the standard time period of the first state and the second state appearing in the OOB signals of the serial ATA protocol, so as to determine whether the signals are the COMINIT/COMRESET signals, or the COMWAKE signals.

Figure 1A:
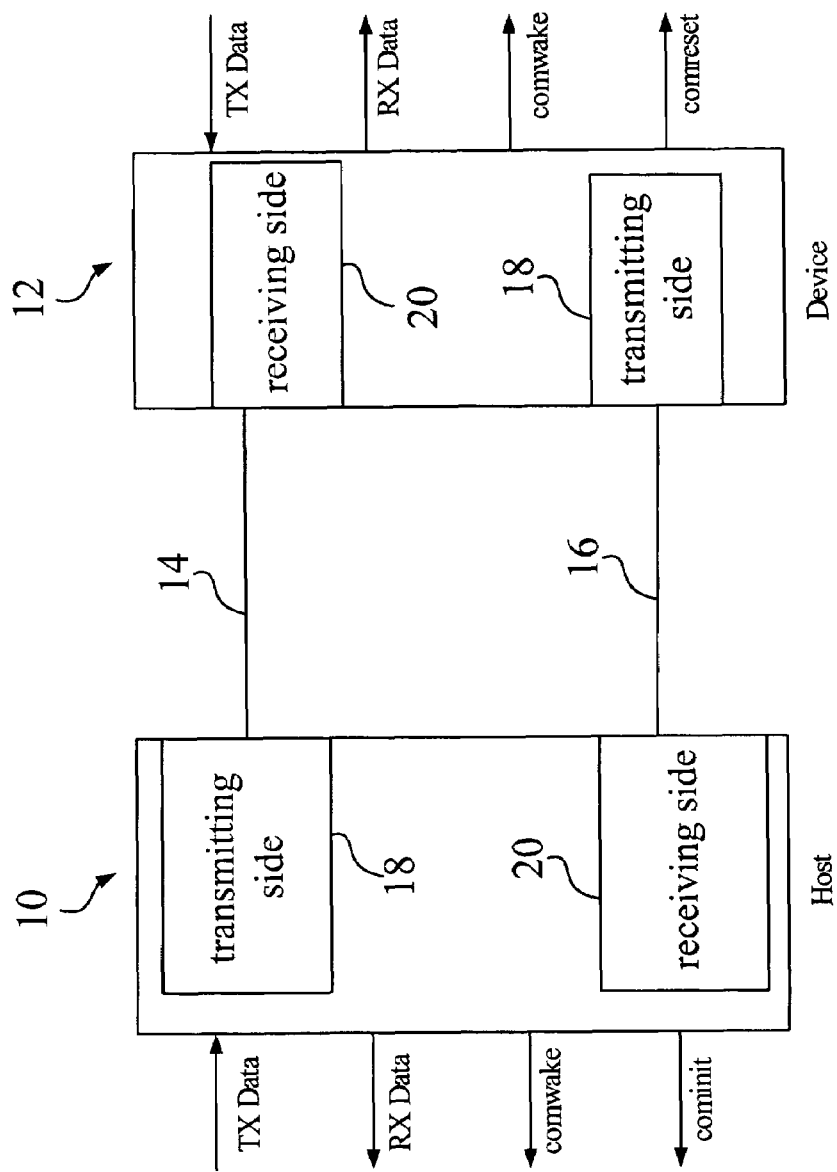
FIG. 1(a) is a schematic diagram of two electronic apparatuses transmitting data between each other based on the SATA standard.
Figure 1B:
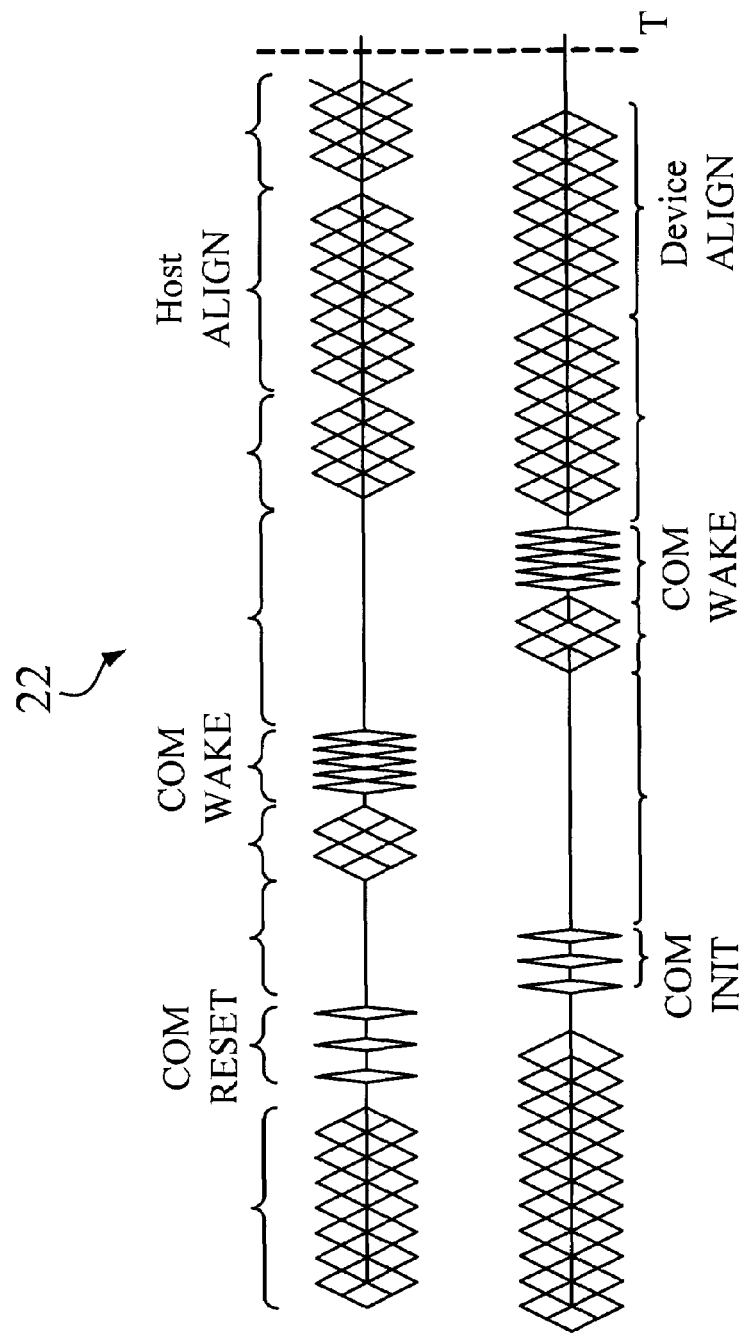
FIG. 1(b) is a waveform diagram of a set of signals of SATA of the prior art.
Figure 2:
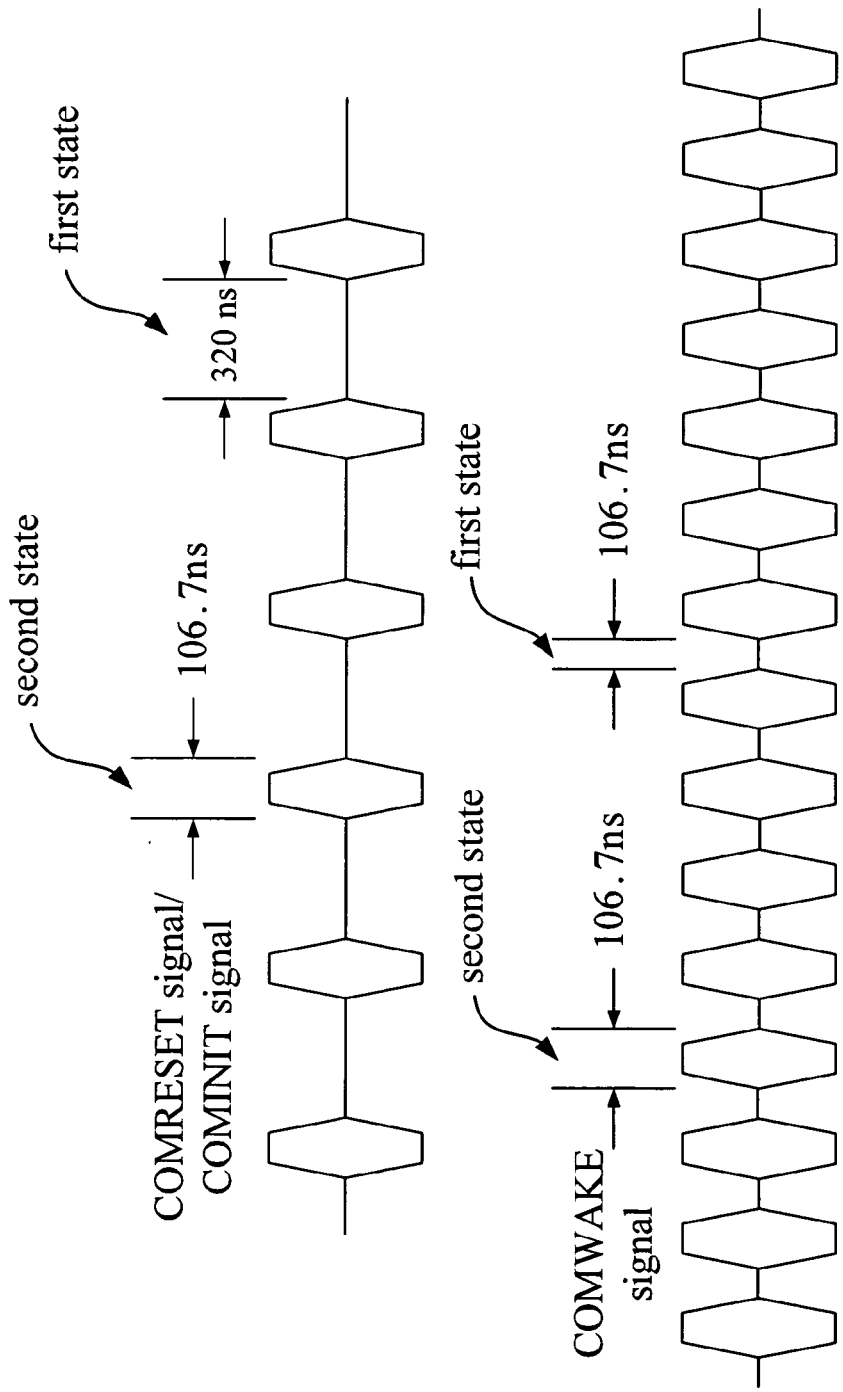
FIG. 2 is a schematic diagram for representing the waveform of the COMRESET signal, the COMINIT signal, and the COMWAKE signal.

In the embodiment which applies the signal detection apparatus 30 shown in FIG. 3 to the electronic apparatus 10 shown in FIG. 1, when the electronic apparatus 10 gets into the idle state, and the waveform simplification module 52 of the signal detection apparatus 30 receives the input signal comprising the second state, the fast/multi-frequency clock generator 40 will be activated to generate the pre-calibrated clock signal 41 to the sampling module 54; therefore, the sampling module 54 will sample the simplified control signal 53 according to the clock signal 41 to generate the detection results. Furthermore, the logic determination device 36 performs judgment on the detection results. When the electronic apparatus 10 is activated, the waveform simplification module 52 of the signal detection apparatus 30 simplifies the waveform, and the sampling module 54 immediately receives the clock signal 39 generated by the crystal clock generator 38 to sample the simplified control signal 53. The signal detection apparatus 30 is applied to the electronic apparatus 10 shown in FIG. 1. The rest of the processes are the same as the above mentioned and won't be described again.

Figure 5:
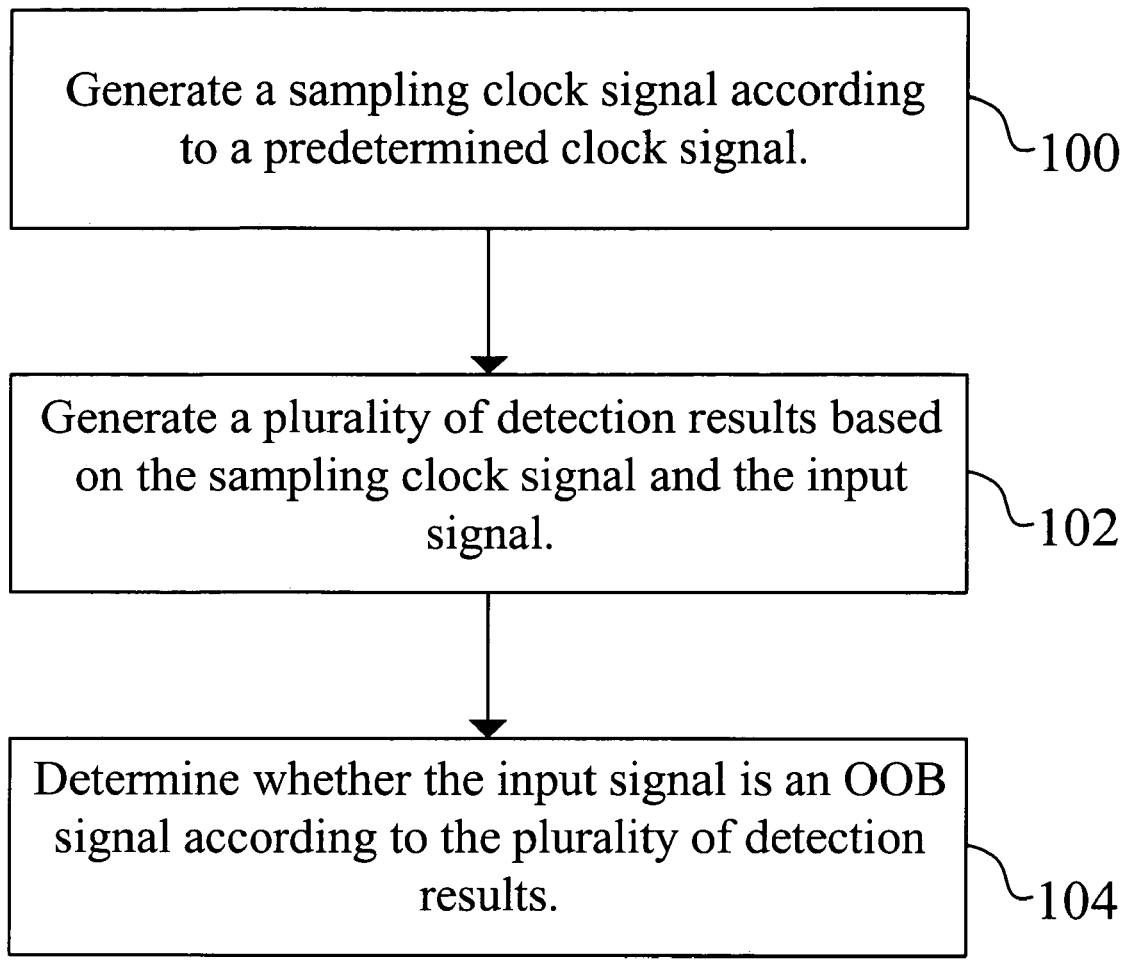
FIG. 5 is a flowchart of the signal detection method according to the present invention.

Referring to FIG. 5, FIG. 5 is a flowchart of the signal detection method according to the present invention. The present invention also provides a signal detection method. When the two electronic apparatuses which transmit serial ATA signals between each other get into the idle state, the signal detection method of the present invention is used for detecting and determining the kind of control signals included in the serial ATA signals. In the embodiment of FIG. 5, the signal detection method is used for detecting whether an input signal of a set of serial ATA signals is an OOB signal. The signal detection method includes the following steps:

Step 100: Calibrate the sampling clock signal according to the predetermined clock signal before the apparatus gets into the idle state, and generate the sampling clock signal when the apparatus gets into the idle state.

Step 102: Sample the input signal in fixed time intervals based on the sampling clock signal, thus generating a plurality of detection results when the apparatus gets into the idle state. Step 104: Determine whether the input signal is an OOB signal according to the plurality of detection results.

The predetermined clock signal can be generated by a crystal clock generator, and the sampling clock signal can be generated by a fast/multi-frequency clock generator. Furthermore, the predetermined clock signal generated by the crystal clock generator can be used for calibrating the fast/multi-frequency clock generator. The system, which utilizes the signal detection method of the present invention, is the same as that of the signal detection apparatus 30 shown in FIG. 3.

Figure 6:
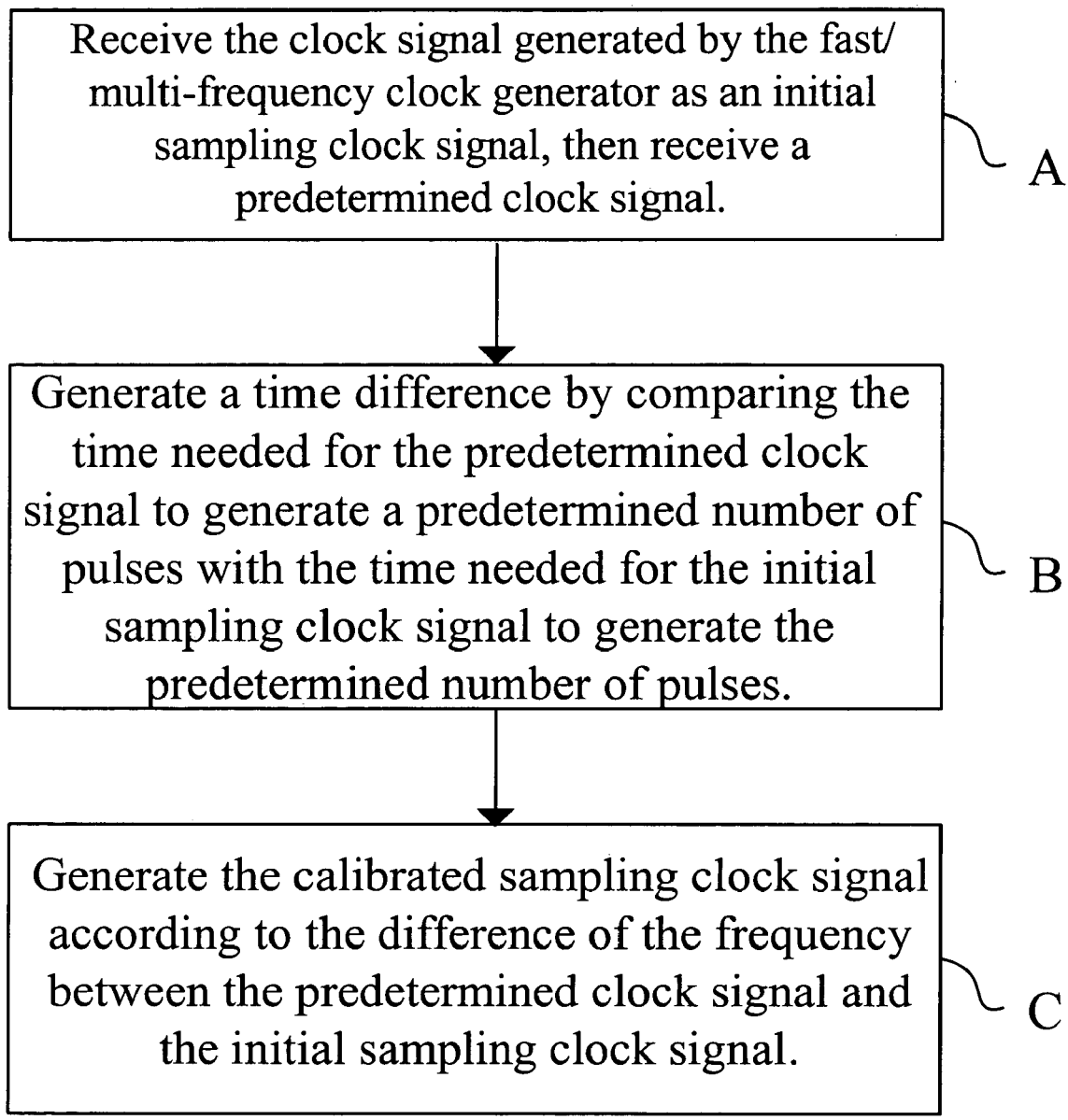
FIG. 6 is a detailed flowchart of the step 100 shown in FIG. 5.

Referring to FIG. 6, FIG. 6 is a detailed flowchart of the step 100 shown in FIG. 5. In the step 100 shown in FIG. 5, the sampling clock signal is a calibrated clock signal. The following will describe the steps of generating the calibrated clock signal in detail, using the signal detection apparatus 30 shown in FIG. 3. The step 100 shown in FIG. 5 further includes the following steps:

Step A: Receive the clock signal 41 generated by the fast/multi-frequency clock generator 40 as an initial sampling clock signal; then, receive the clock signal 39 generated by the crystal clock generator 38 as the predetermined clock signal.

Step B: Generate a time difference by comparing the time needed for the predetermined clock signal to generate a predetermined number of pulses with the time needed for the initial sampling clock signal to generate the predetermined number of pulses.

Step C: Calculate the difference of the frequency between the predetermined clock signal and the initial sampling clock signal based on the time difference, and calibrate the fast/multi-frequency clock generator 40 to generate the calibrated sampling clock signal.

The steps B and C can be performed by the frequency comparator 42 and the controller 44. According to the above-mentioned processes, the predetermined clock signal and the sampling clock signal can be controlled to be at a specific ratio, e.g. 1:1 or 2:3.

Figure 7:
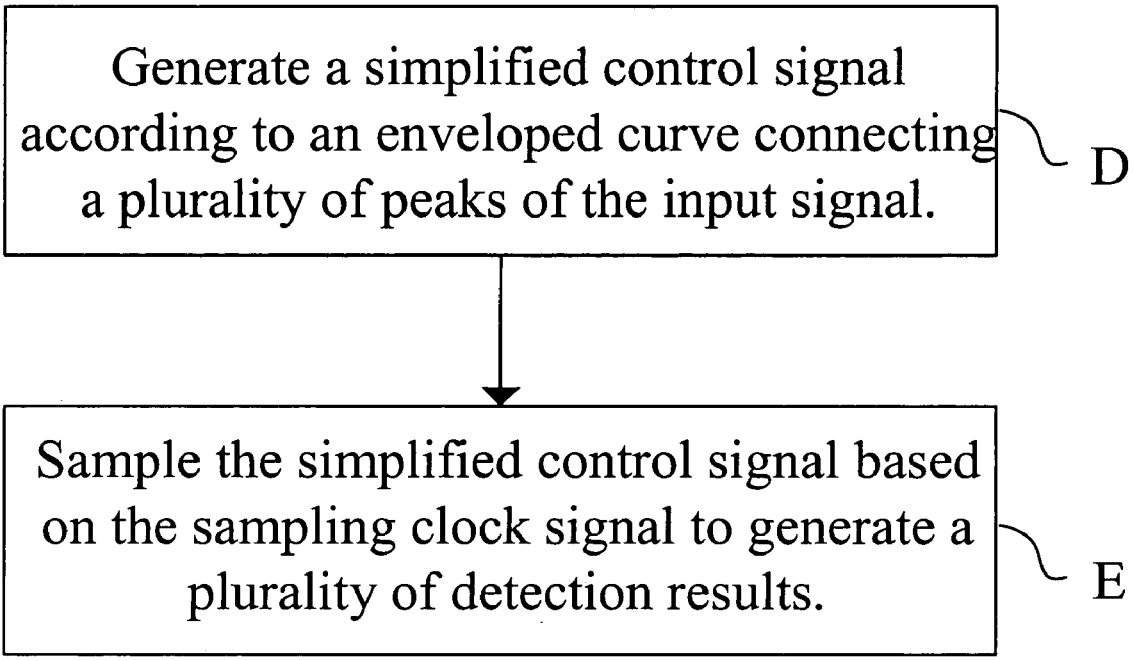
FIG. 7 is a detailed flowchart of the step 102 shown in FIG. 5.

Referring to FIG. 7, FIG. 7 is a detailed flowchart of the step 102 shown in FIG. 5. The step 102 further includes the following steps:

Step D: Generate a simplified control signal according to an enveloped curve connecting a plurality of peaks of the input signal to simplify the idle state and the burst state of the input signal to a simplified control signal consisting of the first state and the second state.

Step E: Sample the simplified control signal based on the sampling clock signal to generate a plurality of detection results.

Figure 8:
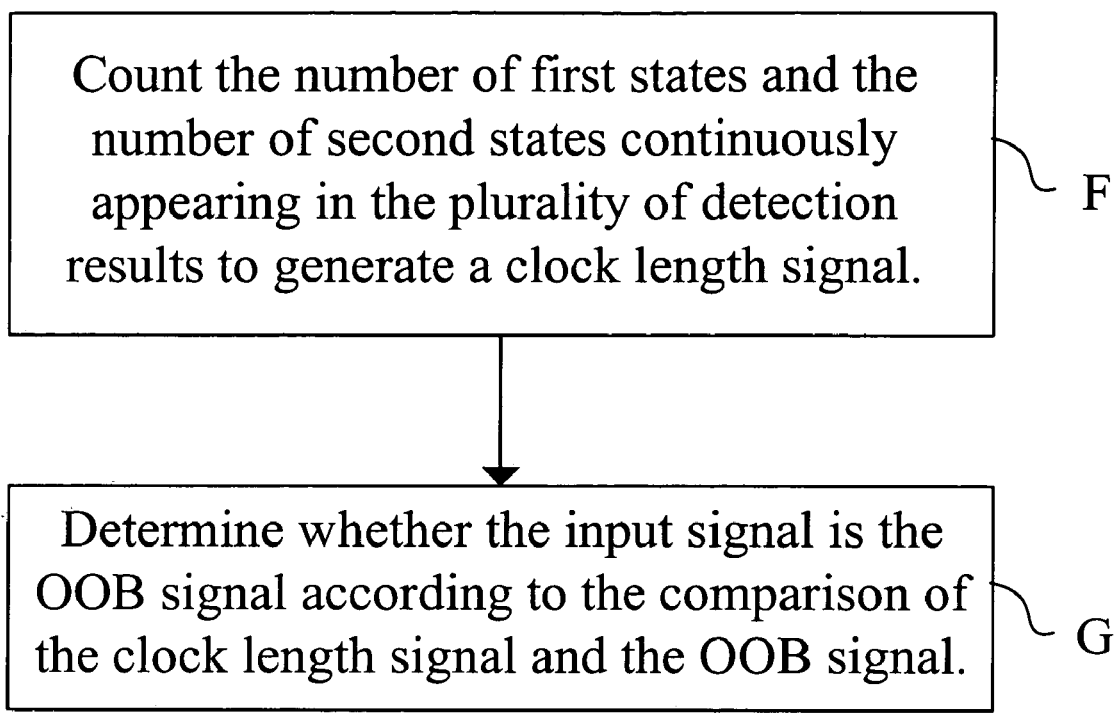
FIG. 8 is a detailed flowchart of the step 104 shown in FIG. 5.

Referring to FIG. 8, FIG. 8 is a detailed flowchart of the step 104 shown in FIG. 5. The step 104 further includes the following steps:

Step F: Count the number of first states and the number of second states continuously appearing in the plurality of detection results to generate a clock length signal, so as to represent the time length of the first state and the second state appearing in the input signal.

Step G: Determine whether the input signal is the OOB signal according to the comparison of the clock length signal and the OOB signal, so as to generate the determination result.

As the above mentioned, the signal detection method of the present invention can further compare the input signal with the COMINIT/COMRESET signal, or the COMWAKE signal to determine whether the input signal is one of the above signals.

Compared to the prior art, the signal detection apparatus of the present invention generates the sampling clock signal quickly based on the calibrated clock generation device, so the apparatus, which utilizes the present invention, can detect the kind of input signal quickly when it is in an idle state, so as to perform the corresponding process.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A signal detection apparatus for detecting whether an input signal of a set of serial advanced technology attachment (ATA) signals is an out of band (OOB) signal, the signal detection apparatus comprising:

a calibrated clock generation device for generating a sampling clock signal according to a predetermined clock signal;

a signal processor for generating a plurality of detection results based on the sampling clock signal and the input signal, the signal processor comprising a waveform simplification module for receiving the input signal and for generating a simplified control signal according to an enveloped curve connecting a plurality of peaks of the input signal, and the signal processor comprising a sampling module for receiving the sampling clock signal and the simplified control signal, the sampling module further sampling the simplified control signal based on the sampling clock signal to generate the plurality of detection results; and a logic determination device for receiving the plurality of detection results and for determining whether the input signal is the out of band signal.

2. The signal detection apparatus of claim 1, the calibrated clock generation device comprising:

a crystal clock generator for generating the predetermined clock signal;

a frequency comparator for comparing the frequency of the predetermined clock signal with the frequency of the sampling clock signal and for generating a frequency comparison result; and a controller for selectively activating the fast/multi-frequency clock generator, the controller further generating a frequency calibration signal based on the frequency comparison result to calibrate the fast/multi-frequency clock generator.

3. The signal detection apparatus of claim 2, the frequency comparator comprising:

a first counter for receiving the predetermined clock signal and for generating a first count completed signal when a predetermined number of pulses are counted in the predetermined clock;

a second counter for receiving the sampling clock signal and for generating a second count completed signal when the predetermined number of pulses are counted in the sampling clock;

a comparator for resetting the first counter and the second counter, the comparator further comparing the first count completed signal with the second count completed signal to generate the frequency comparison result.

4. The signal detection apparatus of claim 1, the signal processor comprising:

a waveform simplification module for receiving the input signal and for generating a simplified control signal according to an enveloped curve connecting a plurality of peaks of the input signal; and a sampling module for receiving the sampling clock signal and the simplified control signal, the sampling module further sampling the simplified control signal based on the sampling clock signal to generate the plurality of detection results.

5. The signal detection apparatus of claim 1, the logic determination device comprising:

a counting module for receiving the plurality of detection results, the counting module further counting the number of first states and the number of second states continuously appearing in the plurality of detection results to generate a clock length signal; and a determination module for determining whether the input signal is the out of band signal according to the clock length signal.

6. The signal detection apparatus of claim 2, wherein the sampling clock signal is generated by the fast/multi-frequency clock generator, and the fast/multi-frequency clock generator generates a clock when the signal detection apparatus detects the input signal, and when the signal detection apparatus is out of an activated state.

7. A signal detection method for detecting whether an input signal of a set of serial advanced technology attachment (ATA) signals is an out of band (OOB) signal, the signal detection method comprising the following steps:

(1) generating a sampling clock signal according to a predetermined clock signal when detecting the input signal and when out of an activated state;

(2) generating a plurality of detection results based on the sampling clock signal and the input signal, the step (2) including the following steps:

(A) generating a simplified control signal according to an enveloped curve of the input signal;

(B) sampling the simplified control signal based on the sampling clock signal to generate the plurality of detection results; and (3) determining whether the input signal is the out of band signal according to the plurality of detection results, the step (3) including the following steps:

(A) counting the number of first states and the number of second states continuously appearing in the plurality of detection results to generate a clock length signal; and (B) determining whether the input signal is the out of band signal according to the clock length.

8. The signal detection method of claim 7, the predetermined clock signal being generated by a crystal clock generator.

9. The signal detection method of claim 7, the step (1) comprising the following steps:

(A) receiving the predetermined clock signal and an initial sampling clock signal;

(B) generating a time difference by comparing the time needed for the predetermined clock signal to generate a predetermined number of pulses with the time needed for the initial sampling clock signal to generate the predetermined number of pulses; and (C) calibrating the initial sampling clock signal to generate the sampling clock signal based on the predetermined clock signal and the time difference.

10. The signal detection method of claim 7, wherein the out of band signal is a COMINIT signal, a COMRESET signal, or a COMWAKE signal.

11. A signal detection method for detecting whether an input signal of a set of serial advanced technology attachment (ATA) signals is an out of band (OOB) signal, the signal detection method comprising the following steps:

generating a sampling clock signal according to a predetermined clock signal;

generating a plurality of detection results based on the sampling clock signal and the input signal, including the step of receiving the input signal, generating a simplified control signal according to an enveloped curve of the input signal, receiving the sampling clock signal and the simplified control signal, and sampling the simplified control signal based on the sampling clock signal to generate the plurality of detection results; and receiving the plurality of detection results and determining whether the input signal is the out of band signal.

12. The signal detection method of claim 11, further comprising steps of:

generating the predetermined clock signal;

comparing the frequency of the predetermined clock signal with the frequency of the sampling clock signal and generating a frequency comparison result; and generating a frequency calibration signal based on the frequency comparison result to calibrate the fast/multi-frequency clock generator.

13. The signal detection method of claim 12, farther comprising steps of:
 counting the predetermined clock signal and generating a first count completed signal when a predetermined number of pulses are counted in the predetermined clock;
 counting the sampling clock signal and generating a second count completed signal when the predetermined number of pulses are counted in the sampling clock; and
 comparing the first count completed signal with the second count completed signal to generate the frequency comparison result.

14. The signal detection method of claim 12, wherein the sampling clock signal is generated by the fast/multi-frequency clock generator, and the fast/multi-frequency clock generator generates a clock when the input signal is detected, and when out of an activated state.

15. The signal detection method of claim 11, farther comprising steps of:
 receiving the plurality of detection results and counting the number of first states and the number of second states continuously appearing in the plurality of detection results to generate a clock length signal; and
 determining whether the input signal is the out of band signal according to the clock length signal.

16. The signal detection method of claim 11, wherein the out of band signal is a COMINIT signal, a COMRESET signal, or a COMWAKE signal.

* * * * *

UNITED STATES PATENT AND TRADEMARK OFFICE
CERTIFICATE OF CORRECTION

| | | |
|---|---|---|
| PATENT NO. | : 7,796,719 B2 | Page 1 of 1 |
| APPLICATION NO. | : 11/125475 | |
| DATED | : September 14, 2010 | |
| INVENTOR(S) | : Liu et al. | |

It is certified that error appears in the above-identified patent and that said Letters Patent is hereby corrected as shown below:

Col. 7
Claim 4, line 40, delete claim "4. The signal detection apparatus of claim 1, the signal processor comprising: a waveform simplification module for receiving the input signal and for generating a simplified control signal according to an enveloped curve connecting a plurality of peaks of the input signal; and a sampling module for receiving the sampling clock signal and the simplified control signal, the sampling module further sampling the simplified control signal based on the sampling clock signal to generate the plurality of detection results.".

Col. 7
Claim 5, line 52, change "5." to --4.--.

Col. 7
Line 62, add in original claim 7, --5. The signal detection apparatus of claim 1, wherein the out of band signal is a COMINIT signal, a COMRESET signal, or a COMWAKE signal.--.

Signed and Sealed this
First Day of March, 2011

David J. Kappos
*Director of the United States Patent and Trademark Office*